Oct. 26, 1965   J. H. BORNZIN   3,213,784
MULTIPLE STAGE HAY WAFERIZER
Filed July 25, 1961   8 Sheets-Sheet 1

INVENTOR.
James H. Bornzin
BY Paul O. Pippel
Atty.

Oct. 26, 1965   J. H. BORNZIN   3,213,784
MULTIPLE STAGE HAY WAFERIZER
Filed July 25, 1961   8 Sheets-Sheet 5

Inventor:
James H. Bornzin
Paul O. Pippel
Atty.

Oct. 26, 1965 J. H. BORNZIN 3,213,784
MULTIPLE STAGE HAY WAFERIZER
Filed July 25, 1961 8 Sheets-Sheet 6

Inventor:
James H. Bornzin
Paul O. Pippel
Atty.

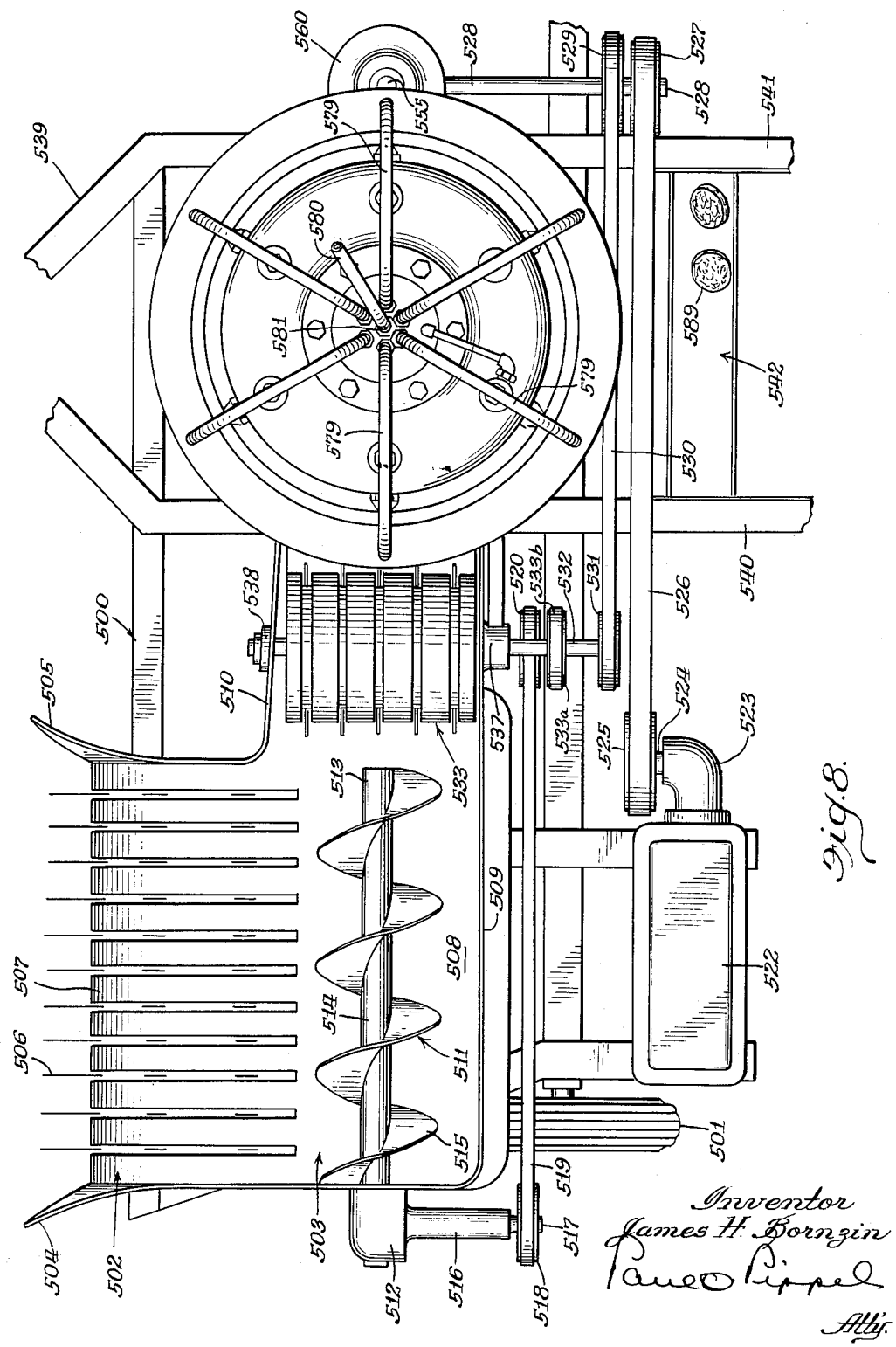

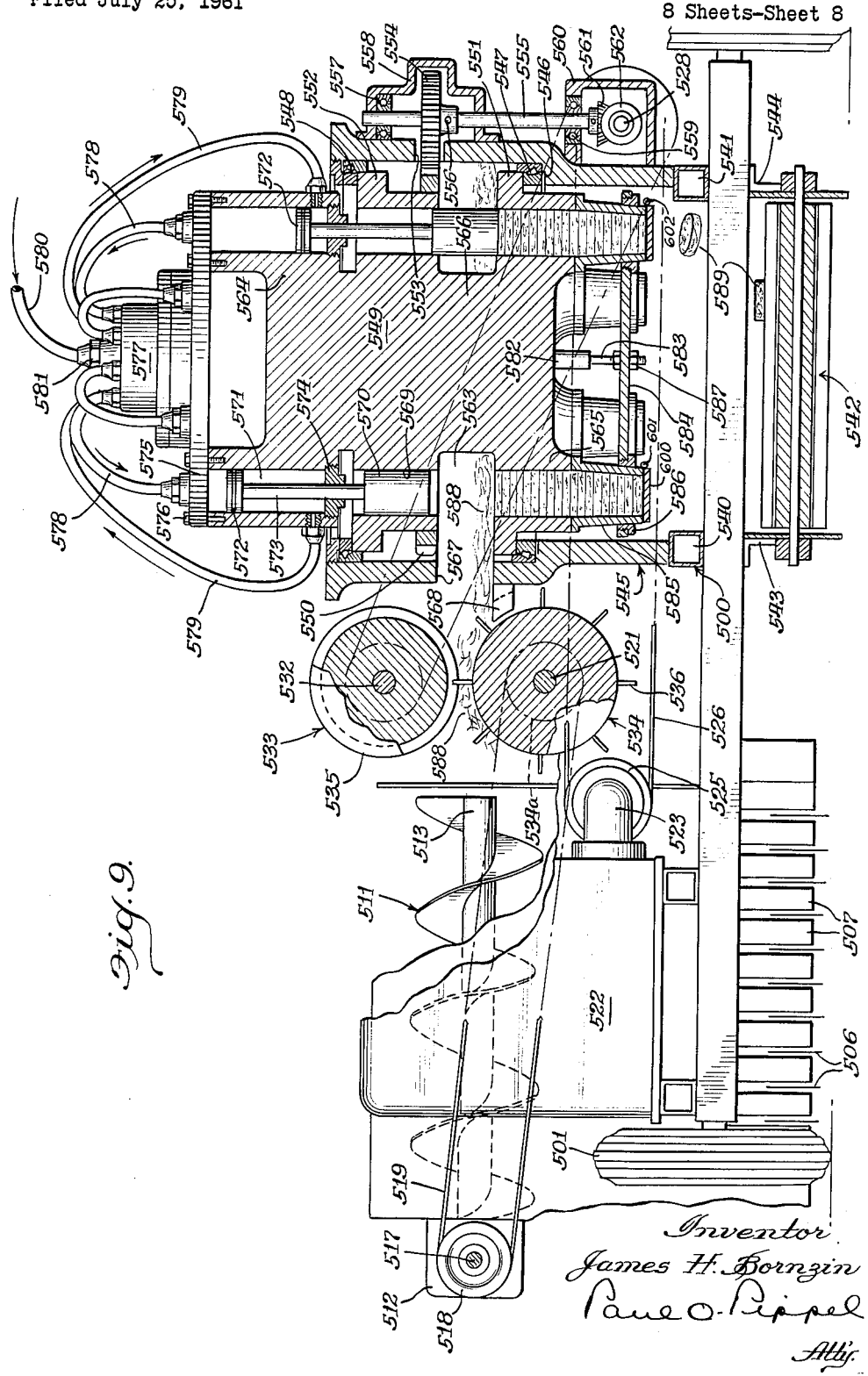

United States Patent Office 3,213,784
Patented Oct. 26, 1965

3,213,784
MULTIPLE STAGE HAY WAFERIZER
James H. Bornzin, La Grange, Ill., assignor to International Harvester Company, Chicago, Ill., a corporation of New Jersey
Filed July 25, 1961, Ser. No. 127,461
7 Claims. (Cl. 100—139)

This invention relates to a new and improved multiple stage ram type waferizer.

The storing of hay for feeding live stock throughout the non-growing times of a year has long been a serious problem to the farmer. The handling and storing of hay has passed through several stages. Originally the hay was cut and allowed to cure and thereafter gathered and stored in large mows and stacks from which the farmer would feed portions to his stock throughout the winter months when the animals could not get into the fields. Since that time the implement industry has been producing devices to compact this loose hay so that it will occupy less storage space. The degree of hay compactness has been gradually increasing. Just recently there have been serious efforts to produce machines which will still further compact the hay into small wafers which are as much as four or more times as dense as bales made by the hay balers with which we are presently familiar. The hay wafers should be of a size which the live stock can eat readily. This then would accomplish a twofold result, one of which provides that substantially the same quantity of hay could be stored in approximately one-quarter of the space required for hay in bale formation and secondly it makes possible the mechanical handling of hay from the field to feeding of the livestock. There are many complex problems associated with a waferizing machine such as, the compacting of the same quantity of hay into wafer form in the same amount of time as was necessary to form bales. Obviously the operator does not want to have to spend considerably more time in making wafers than he did in making bales.

It is, therefore, a principal object of this invention to provide a machine which will produce hay wafers.

An important object of this invention is the provision of means in a waferizing machine for accommodating great quantities of hay and compressing them with great force into relatively small dense pellets or wafers in a minimum amount of time.

Another important object of this invention is to supply a hay wafer making machine having a multiple stage ram type compressing means.

A further important object of this invention is to equip a waferizer with a multiple hydraulic ram type compressing means.

A still further important object of this invention is to provide a multiple ram type waferizer in which the rams are actuated by a wobble or swash-plate.

Still another important object and advantage of this invention is to equip a hay waferizing machine with cooperative precompressor members having constantly moving cooperating surfaces.

Another and still further important object of this invention is to provide a field traversing hay waferizer in which the gathered hay is precompressed by endless belt conveyors arranged in a V-pattern for feeding into a rotating drum having a plurality of waferizer chambers.

A further important object of this invention is to supply cooperative rollers arranged in a manner to preliminarily compress hay before feeding it to a high compression chamber in the making of hay wafers or pellets.

A still further important object of this invention is to provide a precompressor for hay or other like materials in which there is included a pair of cooperative rolls, at least one of said rolls having radially extending fingers arranged and constructed to penetrate the surface of the cooperative roll for positive feeding and compressing of hay therebetween.

Another important object of this invention is to provide in a hay wafering machine a plurality of rams arranged in a generally circular path in a drum member, a precompressing means delivering hay to the drum, means rotating the drum and extending and retracting said rams, causing formation of highly compressed hay wafers in each of the ram chambers in said drum.

A still further important object of this invention is the provision of means to rotatably drive a multi-chambered drum, said means including a wobble plate to effect reciprocation of rams disposed in each of the drum chambers, and interengaging drive elements between the drum and the wobble plate.

Another important object of this invention is to supply a hay wafer making machine with means for rotatably driving a generally vertically disposed drum through an annular ring gear and imparting rotational drive from the drum to a wobble plate which in turn effects reciprocation of a plurality of vertically disposed rams in said drum.

Still another important object is to equip a hay wafer making machine with a vertically disposed drum having an annular hay receiving groove in the side thereof and having vertically reciprocable rams disposed in an annular path around the drum and adapted to pass through the annular hay receiving groove.

Another important object is to effect reciprocation of a plurality of hay compressing rams by fluid pressure means.

Still another important object is to provide a hay waferizer having spaced apart blocks with a plurality of axially aligned chambers therein, and rams reciprocably mounted within said chamebrs and adapted to compress hay within said chambers that is fed between the spaced blocks.

Other and further important objects and advantages will become apparent from the disclosures in the following specification and accompanying drawings.

In the drawings:

FIG. 8 is a top plan view of a still further modified hay waferizer of this invention; and FIG. 9 is a rear elevational view partially in section of the device as shown in FIG. 8.

Figure 1:
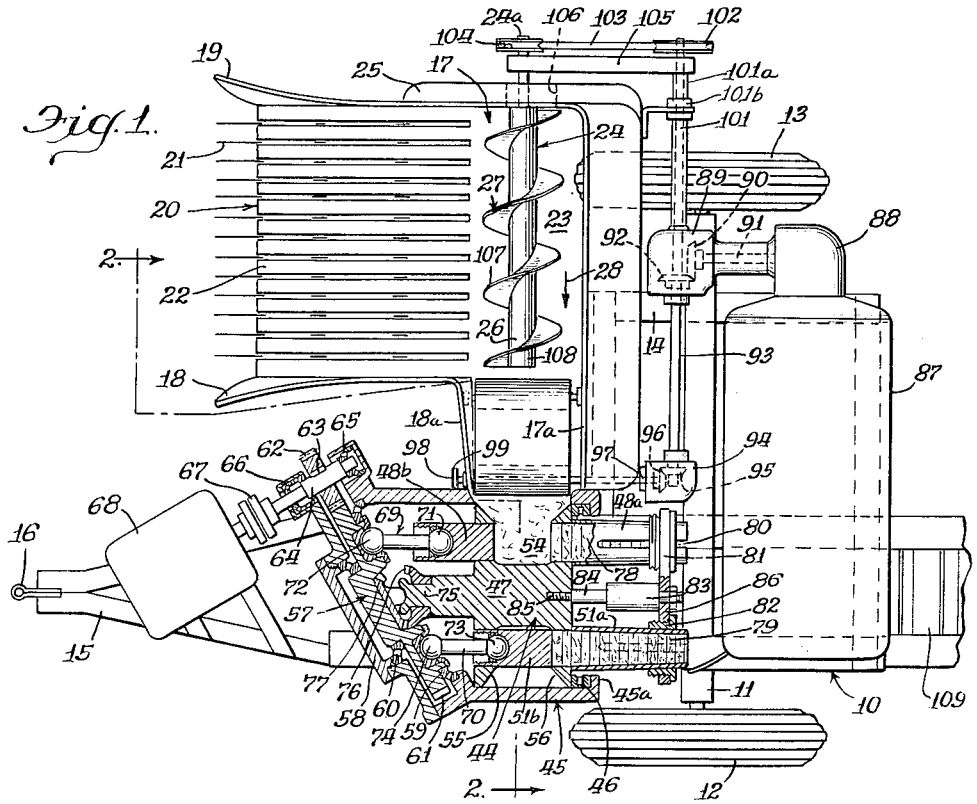
FIG. 1 is a top plan view partially in section of the waferizing machine of this invention.

As shown in the drawings the reference numeral 10 indicates generally a chassis on which the waferizer of this invention is carried. The chassis 10 comprises a transversely disposed axle or shaft 11 which has mounted on its outer ends ground-engaging wheels 12 and 13. The chassis 10 further includes a frame structure 14 on which the machine of this invention is carried. The frame includes a forwardly extending hitch structure 15 terminating in a clevis or the like 16 which is used to attach the implement to a pulling vehicle such as a tractor.

A hay-receiving platform 17 is mounted on and carried by the frame structure 14. The platform 17 is equipped with spaced-apart divider members 18 and 19 and an intermediately disposed pickup cylinder 20. The pickup cylinder includes a plurality of spring fingers 21 disposed between a plurality of spaced-apart curved leaf-like strip members 22 which extend rearwardly for positioning over the platform deck 23 of the platform 17. The hay in a windrow or the like is picked up by the spring fingers 21 and thrown upwardly and rearwardly onto flat portions of the spaced-apart members 22. Thereafter the hay is carried rearwardly by the fingers 21 for deposit onto the solid sheet metal deck 23 of the platform 17.

Figure 2:
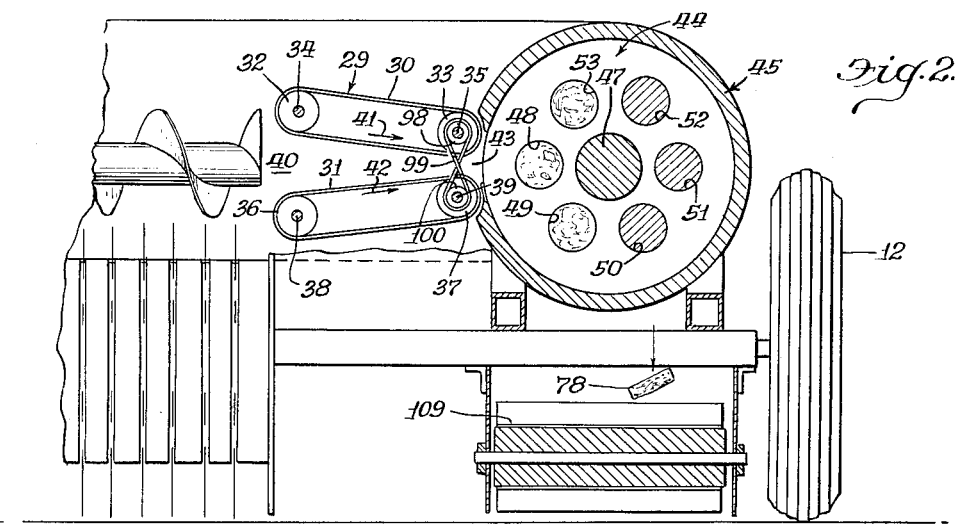
FIG. 2 is a sectional view taken on the line 2—2 of the waferizing machine of FIG. 1.

An auger conveyor 24 mounted on a shaft 24a is transversely disposed over the platform 17 to feed harvested crop material thereacross. The mounting and rotational driving of the shaft 24a will be subsequently described. The shaft 24a passes through an end wall 25 of the platform. The auger conveyor includes a central core member 26 and screw flight 27. Harvested hay is carried over the platform deck 23 in the direction of the arrow 28 for delivery to a precompressing means 29 such as illustrated in FIGURE 2. The waferizing machine of FIGS. 1 and 2 employs a means for compressing hay within a multi-chambered drum to be subsequently described. In the machine of FIGS. 1 and 2 the power and reciprocable drive for effecting compression of the hay within the chambers of the drum takes the form of a wobble or swash plate.

The several figures of the drawings show various forms of hay compressing machines. Obviously, there are numerous elements in common with each of these machines. One such element or feature is a pre-compression means for the hay at a time following engagement of and picking up of the hay and prior to insertion of the hay into the final compressing means. The pre-compression means 29 shown in FIGURES 1 and 2 comprises upper and lower endless belts 30 and 31. The area within which the pre-compression means 29 is located is defined at its back by a rear wall 17a of the platform 17 and at its front by a continuation 18a of the side divider member 18 of this same platform 17. The upper endless belt 30 is mounted on spaced rollers 32 and 33 which are respectively carried on shafts 34 and 35. These shafts 34 and 35 are journaled for rotation within the spaced wall and extension members 17a and 18a. The roller 32 is disposed substantially higher than the roller 33, thereby causing the belt conveyor 30 to be inclined downwardly and inwardly from a position adjacent the discharge end of the platform auger conveyor 24 to the position of entry of pre-compressed hay into a multi-chambered drum to be subsequently defined. The endless belt 31 is disposed beneath the inclined belt 30 and is similarly mounted on roller members 36 and 37 which are respectively carried on shafts 38 and 39. As stated above for the belt 30, the shafts 38 and 39 for the belt conveyor 31 are journally carried within the longitudinally spaced-apart sheets 17a and 18a. The roller 36 is disposed beneath the level of the spaced-apart roller 37 thus causing the disposition of the belt 31 to be opposite that of the belt 30, thereby providing an upwardly inclined conveyor. This construction defines a relatively wide hay receiving mouth 40 between the rollers 32 and 36 at the position of discharge of hay from the platform auger conveyor 24. The spacing between the rollers 33 and 37 is considerably less than the spacing between the rollers 32 and 36. The lower portion (as viewed in FIG. 2) of conveyor belt 30 moves in the direction of the arrow 41 and similarly the upper portion of conveyor belt 31 moves in the direction of the arrow 42 so that adjoining surfaces of the belts move inwardly of the machine in the same direction. Hay delivered to the wide mouth 40 of the pre-compression member 29 will be preliminarily compressed as it moves laterally between the jointly inwardly moving converging portions of belts 30 and 31 to the narrow opening 43 defined between the rollers 33 and 37.

As shown in FIGURES 1 and 2, a drum or rotor element 44 is journally mounted within a sleeve-like housing 45. An annular bearing member 46 is disposed intermediate the drum 44 and an inwardly turned end flange 45a of the sleeve-like housing 45. The drum 44 is specially constructed to include a central hub member 47 flanked by a plurality of generally parallel, annularly spaced apart longitudinally extending bores 48, 49, 50, 51, 52, and 53. An annular groove 54 projects radially inwardly from the side of the cylindrical drum and includes portions of the areas occupied by the longitudinal bores 48 to 53. The annular groove 54 is provided with annular tapered opening surfaces 55 and 56 to thereby provide an enlarged mouth portion for the drum located adjacent the pre-compression element discharge opening 43. It should be understood that the feed of the pre-compressed hay is not made separately to each hole or bore 48 to 53 but rather is made within the annular groove 54 so that the hay may be admitted without obstruction and subsequently piston or plunger mechanisms cooperating with each of the bores will cause compression of the already pre-compressed hay into wafer formation. As shown in FIGURE 1, discharge tubes 48a and 51a adjoin the drum 44 in alignment with the bores 48 and 51 respectively. Similarly, corresponding discharge tubes are provided for each of the bores 49, 50, 52, and 53. Further as shown in FIGURE 1, pistons or rams 48b and 51b are shown engaging the bores 48 and 51 respectively for the purpose of further compressing the pre-compressed hay which is fed thereto. The plurality of pistons represented by 48b and 51b are reciprocated longitudinally by means of a wobble or swash plate 57. The wobble plate 57 is journally mounted within a portion of the housing 45 and is enclosed therein by a cap member 58 joining the forward portion of the housing 45. The wobble plate is provided with spaced-apart annular bearing members 59 and 60 to facilitate its free rotation. The plate 57 in addition to acting as a wobble member to cause longitudinal reciprocation of the plurality of individual pistons 48b and 51b is equipped on its outer periphery with gear teeth 61. It is by these external gear teeth that the wobble plate 57 is rotatably driven. A spur gear 62 engages the gear teeth 61 on the wobble plate 57 and imparts rotational drive to the wobble plate. The spur gear 62 is keyed, as shown at 63, to a shaft 64 which is journally mounted in a bearing 65 at one end thereof within the housing 45 and within a spaced-apart bearing 66 in the housing 45 in alignment with the cap portion 58 of this housing. The shaft 64 extends outwardly through a coupling member 67 and thence to a motor or engine 68 which delivers rotation thereto. Piston rods are shown at 69 and 70 for joining the pistons to the wobble plate 57. The two rods 69 and 70 are representative of all of the plurality of rods which join the plurality of pistons within the longitudinal bores 48 through 53 inclusive. The piston rod 69 includes a ball end 71 which engages a socket in the end of the piston 48b for universal joint movement. The forward end of the piston rod 69 is similarly ball shaped as shown at 72 and is received into a correspondingly shaped socket in the wobble plate 57. The piston or connecting rod 70 is similarly provided with balls at its rearward and front ends 73 and 74 which engage sockets in the piston 51b and the wobble plate 57 respectively. The hub 47 of the rotor 44 has a forwardly extending projection 75 which has a bevel gear 76 at its forward end. A cooperating bevel gear 77 is provided on the center of the wobble plate 57 adjacent the bevel gear 76 whereby rotation of the wobble plate imparts not only rotation to the piston rods which are exemplified by the members 69 and 70 but also to the rotor 44 through the engagement of the bevel gears 76 and 77. The device described to this point is adapted to feed pre-compressed hay into the area of the rotor 44, whereupon the wobble plate driven pistons cause compression of the hay into pellet or wafer formation and extrued the formed wafers, which are indicated at 78 in the tube 48a and 79 in the tube 51a. The discharge tubes 48a and 51a which, as previously stated are representative of all of the tubes adjoining each of the longitudinally extending bores in the rotor 44, are slightly conical in shape during normal operation. In other words, the tubes 48a and 51a taper downwardly and inwardly as they progress rearwardly, thereby causing greater compression of the pellets 78 and 79 within these tubes. The tubes are longitudinally slitted, as shown at 80. Clamp members 81 and 82 encircle the outer or rearward ends of the slitted tubes. These clamps or ring members 81 and 82 are preferably conically shaped so that as they move inwardly or outwardly they contract or permit expansion of the discharge tubes. The position of the rings is preferably dependent upon the degree of compression of the wafers being formed therein. A hydraulic cylinder 83 disposed centrally of the discharge tubes 48a and 51a has a cooperating piston 84 threadedly engaged as at 85 to the drum or hub portion 47 of the rotor 44. The hydraulic cylinder 83 is mounted on a plate member 86 which carries the several tapering rings 81 and 82 as shown in FIGURE 1. When fluid under pressure is admitted to the cylinder 83 the tubes 48a and 51a are allowed to expand, whereas when fluid under pressure is withdrawn from the cylinder 83, the wedge locking rings 81 and 82 are drawn upwardly onto the tubes 48a and 51a, thereby reducing the discharge opening.

A large engine 87 performs the multiple functions of driving the pickup mechanism, the platform auger, and the pre-compressing means. A gear box 88 on the end of the engine 87 is arranged and constructed to deliver rotational drive to a forwardly spaced gear box 89 which, as shown in dash lines, is equipped with a first bevel gear 90 mounted on a shaft 91 coming from the gear box 88. A second bevel gear member 92 is mounted on a transverse shaft 93 extending across and behind the platform 17. The inner end of the shaft 93 terminates in a housing 94, which carries a bevel gear 95 and a cooperating bevel gear 96. The gear housing 94 thus acts to transmit the drive from the input shaft 93 to an output shaft 97 on which the bevel gear 96 is mounted. The shaft 97 projects forwardly and merges into the shaft 35 on which the roller 33 is mounted for carrying the belt conveyor 30. The lower cooperative tapered belt conveyor 31 is driven from the upper belt 30 by a V-pulley 98 mounted on the shaft 35 having a V-belt 99 engaged therewith and extending down and across for engagement with a V-pulley 100 on the shaft 39 of the lower conveyor 31. This, then, insures that the directional drive of the upper conveyor will be in the direction of the arrow 41 and the drive of the lower belt 31 will be in the direction of the arrow 42. This means also that the cooperative inner faces of the angularly inclined conveyors 30 and 31 feed material along their inner surfaces from a relatively wide mouth 40 at the discharge end of the auger conveyor 24 inwardly to the small discharge portion 43 and thence into the pellet-making rotor 44, as pictorially shown in FIG. 2.

An extension 101 of the shaft 93 projects from the other side of the gear housing 89. The outer end of the shaft extension 101 carries a V-pulley 102 on which is mounted a V-belt 103 to drive a V-pulley 104 mounted on the auger shaft 24a. Drive is thus imparted from the engine 87 through the gear box 89 and down through the V-belt 103 to the auger 24. An arm 105 is fixedly attached to a sleeve 101a, which is journally supported over the shaft 101. The lower end of the arm journally supports the auger shaft 24a. The sleeve 101a is carried in spaced positions by a bearing 101b and the gear housing 89. The arm 105 and its rigid sleeve 101a is a rigid arm and thus is the means for maintaining uniform spaced-apart position of the auger shaft 24a from the drive shaft 101. The auger 24 is preferably of the type which has floating movement over the platform 23 such that with the admission of greater amounts of hay the auger 24 may rise sufficiently to permit any quantity of hay to pass therebeneath and be fed transversely into the pre-compressing cooperative angularly disposed belts 30 and 31. Thus the auger shaft 24a is not journaled within the side sheets 25 of the platform, but rather is journally carried within the hinged arm 105. An elongated opening 106 is provided in the end wall 25 through which the auger shaft 24a may have arcuate swinging movement with the arm 105.

In the operation of the waferizing machine as shown in FIGS. 1 and 2, the machine is pulled through a field of material to be waferized in which the material is preferably arranged in windrows. The windrow of hay is picked up by the mechanism 20 and delivered to the platform deck 23 on which the auger 24 is adapted to feed the hay transversely thereon into the precompressing device 29. The auger conveyor 24, as previously stated, is of the floating type so that as greater or lesser quantities of hay are delivered to the platform 23, the auger can accommodate such varying quantities by merely rising or falling onto the mat of hay which is fed across the platform beneath the auger. Screw flight 107 on the auger 24 is the means for effecting transverse movement of the hay, and the hay so conveyed is passed through the unjournaled end 108 of this auger conveyor 24. As the hay is discharged from the auger 24 into the pre-compression mechanism 29, it passes through a relatively wide-mouthed entrance 40 which is defined by the widely spaced-apart outer ends of the belt conveyors 30 and 31. The working runs of conveyors 30 and 31 are driven in the directions of the arrows 41 and 42, respectively, so that the inner adjoining surfaces of the belts move the hay in an extension or continuation of the direction of movement of the hay by the auger 24. The hay so moved is condensed for passage through the relatively smaller discharge opening 43 at the inner ends of the angularly disposed belts 30 and 31. Following this pre-compression from the volume at the wide mouth 40 to the volume at the small opening 43, the hay is moved into the wafer-forming rotor 44. As clearly shown in FIG. 1, the pre-compressed hay to be waferized is permitted to enter into and around the passageway surrounding the central core 47. With the hay in this position it is thereafter compressed by one of the multiple number of small rams or pistons by reason of the action of the wobble plate such that the charge of hay by any one stroke of the pistons is clearly defined and forms wafers or pellets 78 and 79 in the inwardly tapering discharge tubes 48a through 53a. As the wafers 78 and 79 are extruded from these restricted tubes they fall into an upwardly and rearwardly inclined elevator 109. It should be understood that any hay that is not pressed into one of the ram cylinders will return to the front or hay receiving side of the rotor where new incoming hay is mixed therewith. This causes a redistribution so that no hay remains in a "dead" or inactive area.

Figure 3:
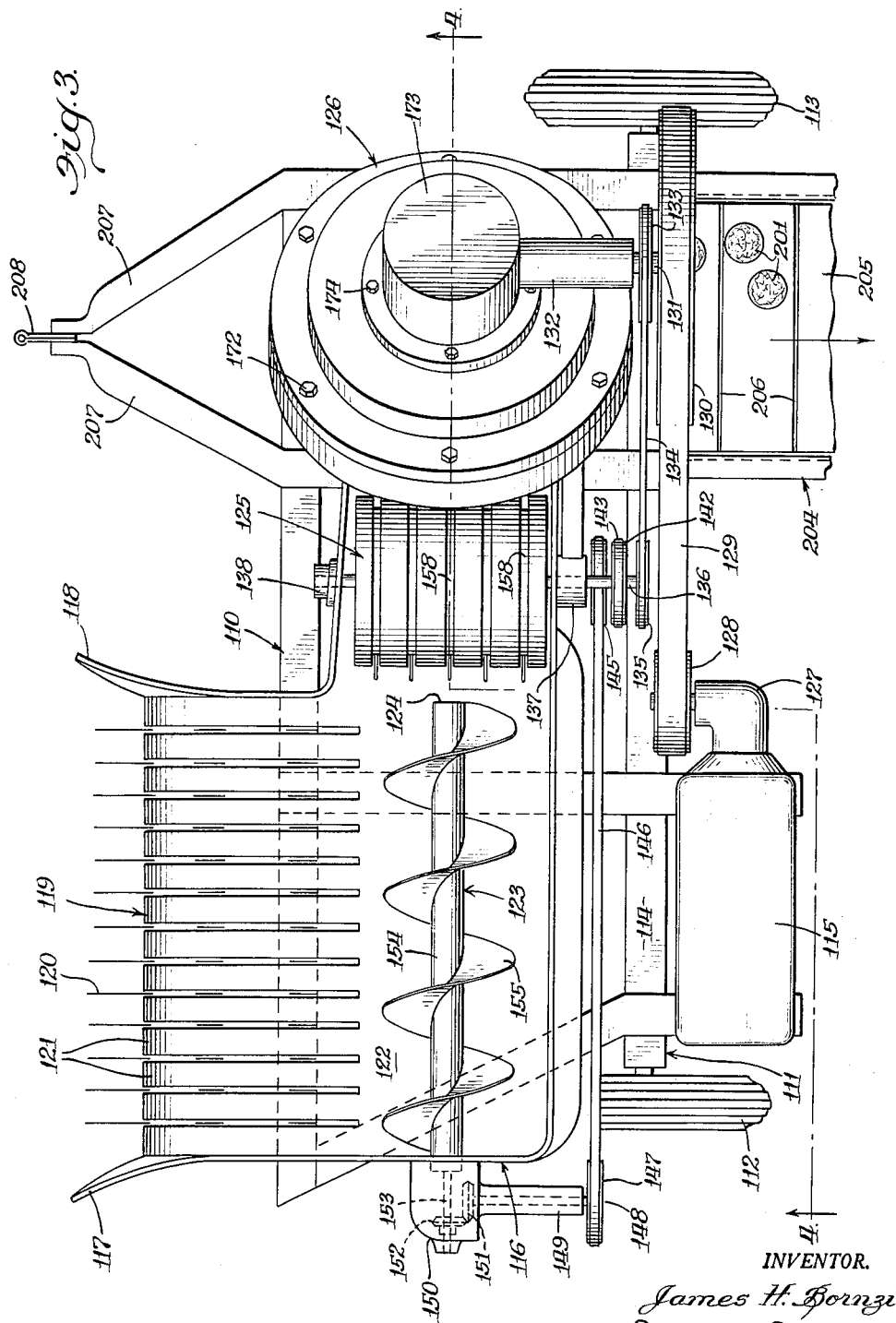
FIG. 3 is a top plan view of a modified form of hay waferizing machine.
Figure 4:
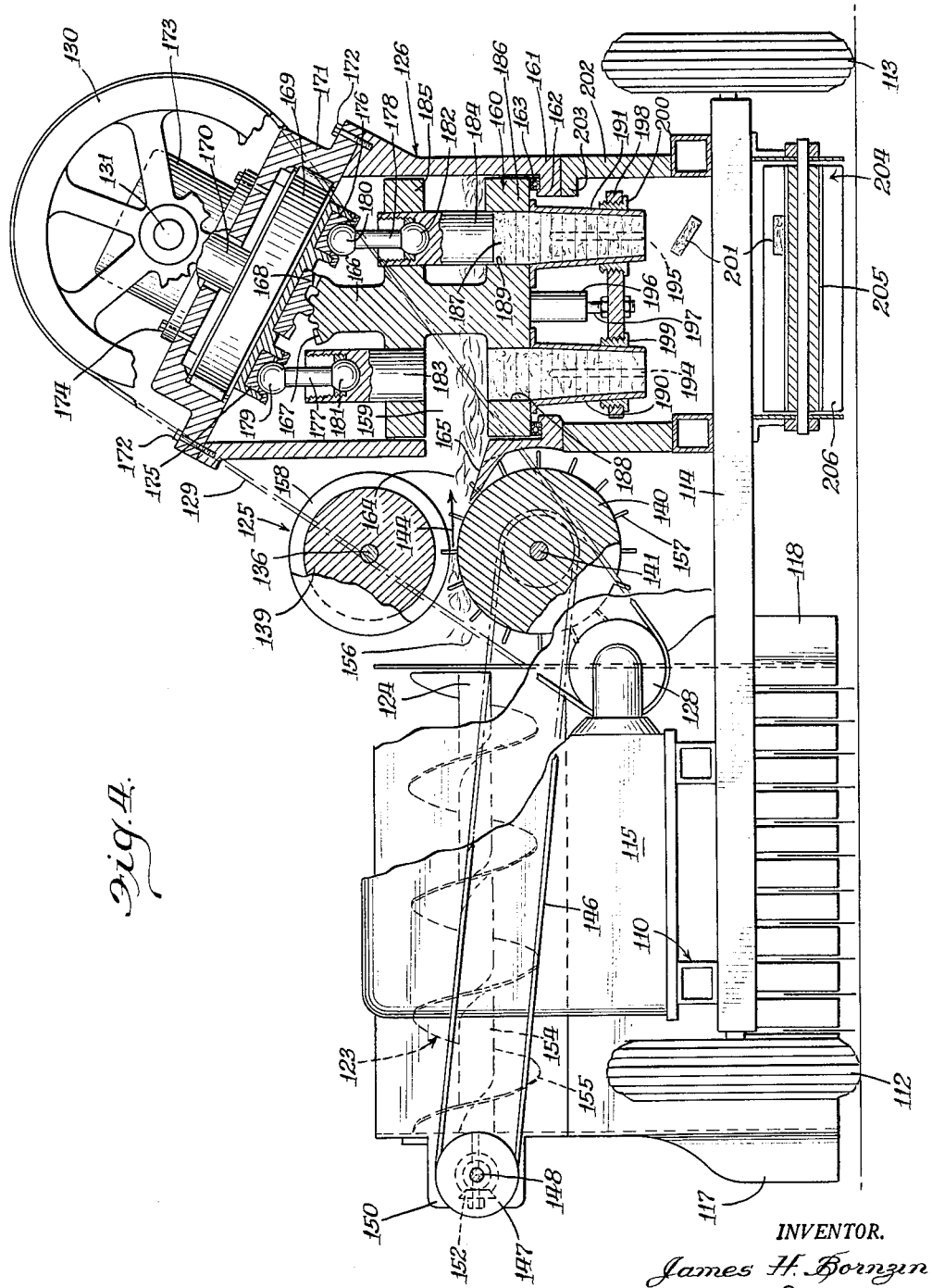
FIG. 4 is a sectional view taken on the line 4—4 of FIG. 3 with drive elements superimposed on the sectional portion for clarity.

FIGURES 1 and 2 show a preferred embodiment of this invention. However, it should be understood that the principles incorporated in the waferizer of this invention may take several forms. The device, as shown in FIGURES 3 and 4, is a modification of the device of FIGURES 1 and 2 yet it includes all of the principles of the device of FIGURES 1 and 2. Primarily we are concerned with the formation of hay wafers within a rotor having a multiple number of chambers therein. In the device of FIGURE 1 the disposition of the multi-chamber wafer forming rotor is horizontal whereas in FIG- URES 3 and 4 the rotor is disposed vertically, so that wafers as formed are extruded downwardly therefrom. Also, the hay in a pre-compressed state is delivered to the rotor through the side.

Looking now specifically to FIGURES 3 and 4, the waferizer therein is depicted as having a frame structure 110 which is carried by a wheel supporting truck 111. The wheel truck 111 includes laterally spaced apart wheels 112 and 113 joined by a transversely disposed carrying tube 114. An engine 115 arranged and constructed to impart rotational drive to the waferizer of this invention is mounted over the wheel truck 11 and on a side of the frame structure 110 opposite a wafer-making mechanism 126. These are the two heavy elements of the machine and, hence, a balancing of them about the wheel carrying truck 111 makes for a more efficient waferizer operation.

The frame structure 110 has mounted thereon a platform 116 which is provided with laterally spaced apart crop gathering points 117 and 118 at the forward end thereof. Between the points is a hay pickup cylinder 119. The pickup 119 includes a plurality of spring-like fingers 120 which throw the hay from a windrow up and over the top of spaced-apart slat members 121 which merge into the floor or deck 122 of the platform 116. It is on this deck 122 that the hay is then fed transversely by means of the transversely disposed auger conveyor 123. The auger conveyor is unjournalled at its inner end as shown at 124 and delivers material to be waferized through the open end thereof into a pre-compressing member 125 which in turn delivers the material for waferizing in a pre-compressed state to the actual and final waferizing member 126. The drives for the various elements are obtained from the engine 115. The engine delivers rotational drive through a gear housing 127 to a pulley 128 disposed at right angles to the engine 115. A belt 129 is adapted to deliver rotation from the pulley 128 to a large pulley 130. The pulley 130 is mounted on a shaft 131 which delivers rotational drive through a tubular housing 132 to the wafer-making device 126. The large pulley 130 also functions as a flywheel to maintain uninterrupted drive without appreciable surging in the making of hay wafers.

The shaft 131 also carries a V-pulley 133 which has a belt 134 to impart drive to a V-pulley 135 mounted on a shaft 136. The shaft 136 is journally mounted in spaced bearing members 137 and 138 which are in turn carried on the frame supporting structure 110 and an extension of the divider point 118 respectively. Further the shaft 136 has mounted thereon a drum or rotor member 139 constituting a part of the pre-compressing device 125. As shown in FIGURE 4 a cooperative rotor 140 constitutes the complementary part of the pre-compressing device 125. The rotor 140 is mounted on a shaft 141. A V-pulley 142 mounted on the shaft 136 has a belt 143 for delivering rotational drive down to the shaft 141 which has not been shown in detail. It should however be understood that the belt 143 is crossed so that the direction of rotation of the rotor members 139 and 140 will be opposite to one another whereby the adjoining surfaces at the discharge end 124 of the auger conveyor 123 will be moving in the direction of the arrow 144. The shaft 141 also carries a V-pulley 145 which by means of a belt 146 imparts drive to a V-pulley 147 mounted on a shaft 148. The shaft 148 is carried in a tubular housing 149 which terminates in a gear housing 150. A bevel gear 151 is mounted on the forward end of the shaft 148 and this gear is in meshing engagement with a bevel gear 152 mounted at right angles thereto and carried on a shaft 153 on which the auger conveyor 123 is mounted. The auger conveyor comprises a core 154 and screw flight 155.

The cooperative pre-compressing rollers 139 and 140 are equipped with intermeshing elements to insure the passage of hay 156 from the discharge end 124 of the auger conveyor through the pre-compressing apparatus 125 and thence into the pellet making mechanism 126. The rotor 140 includes a plurality of spaced-apart radial fingers 157. These fingers are arranged and constructed to enter into spaced-apart annular grooves 158 in the upper roller 139. It is apparent that in the operation of the mechanism the fingers 157 act as a hay pickup from the unjournalled end 124 of the auger 123 for moving the hay into the juncture between the vertically positioned cooperative rolls 139 and 140. The passage of hay between these rolls causes the hay to become preliminarily compacted for subsequent delivery in the direction of the arrow 144 into the annular chamber 159 within the rotor member 160. The rotor 160 is journally carried in a substantially vertically disposed cylindrical housing 161 which forms a part of the over-all wafer-making device 126. The housing 161 includes an internal annular flange 162 which is superposed by a bearing 163 on which the rotor 160 is mounted. The driving means for the rotor 160 and the reciprocation of the multiple number of rams within the rotor will hereinafter be described in detail. In the feeding of hay 156 through the pre-compressing device 125, it is positively guided into the entrance to the annular chamber 159 of the wafer making device 126 by a notched lip 165 on the housing 161.

Of course the rotor 160 is comparable in construction to the rotor 44 shown in FIGS. 1 and 2. It is merely the disposition of the rotor in another plane and in cooperation with a different arrangement of hay feeding elements that produces the combination device as shown in FIGS. 3 and 4. The rotor 160 is provided with an upwardly extending central post or shaft 166, as best shown in FIG. 4. The top of the shaft 166 has a bevel gear 167. The bevel gear 167 is shown meshing with a bevel gear 168 mounted on the underside of a wobble plate 169. The bevel gear 168 is mounted centrally of this wobble plate 169 and by reason of its location does not have relative change in vertical position. The wobble plate 169 is in turn provided with an upwardly projecting shaft member 170 which is journally mounted along with the rotor within a cap-like housing 171 which, as shown in FIG. 4, is fastened by means of bolts or the like 172 to the upper end of the housing 161. The shaft 170 is preferably rotatably driven through gear elements, not shown, within a housing 173 which in turn receives incoming rotational drive from the shaft 131 and through the tubular housing 132. The gear housing 173 is mounted on and fastened to the cap-like housing 171 by means of capscrews 174.

The wobble plate 169 is further provided with a plurality of circularly spaced-apart sockets 175 and 176, such as shown in FIG. 4. However, these sockets are intermittently located around the full annular periphery of the wobble plate 169, such as in FIG. 2 wherein there are six such sockets in the wobble plate to carry connecting rods 177 and 178. The upper ends of the connecting rods are ball-shaped as shown at 179 and 180 and are received into the sockets 175 and 176 respectively to permit a hinged movement of the connecting rods within the wobble plate 169. The lower ends of the connecting rods are provided with ball-shaped ends 181 and 182 and are respectively mounted within sockets in reciprocable piston members 183 and 184. The rams or pistons 183 and 184 are journaled in the rotor 160. More particularly, the rotor has upper and lower annular flanges 185 and 186 which define the vertical space of the annular chamber 159 into which pre-compressed hay is fed. As shown in FIG. 4, the piston 183 is retracted upwardly so that it is merely journaled for sliding movement in the upper flange 185 of the rotor 160. In the case of the piston 184, the piston is shown completely down where it has passed through the annular hay receiving chamber 159 and caused a charge of hay 187 to be pushed downwardly into the piston passage in the annular flange 186. The passage in the rotor 160 for the piston 183 and hay 164 is shown at 188 and similarly the passage for the piston 184 and hay 164 is shown at 189. Wafer discharging tubes 190 and 191 are attached to the underside of the rotor 160 beneath and in alignment with the passageways 188 and 189 respectively. The tubes 190 and 191 are preferably of the slotted type wherein open end slots 194 and 195 are cut inwardly from the bottom ends of the tubes to permit contracting or expanding of the tubes depending upon the density of the wafers 187 being formed therein. A fluid operated cylinder 196 is provided beneath and centrally of the rotor 160. This cylinder is equipped with a downwardly depending piston 197 to which is attached a plate 198. The plate 198 carries a plurality of tapered bushing members 199 and 200 as shown in FIG. 4. The bushings 199 and 200 are arranged and constructed to engage the annular peripheries of the downwardly depending discharge tubes 190 and 191 and by means of extending and retracting the piston 197 within the cylinder 196 the discharge ends of the pellet forming tubes 190 and 191 are contracted or expanded as necessary to the formation of highly compacted hay wafers suitable for animal feeding.

The discharge of the wafers shown completed at 201 is through an annular chamber defined by an auxiliary housing 202 which at its top has an inwardly turned annular flange 203 to mate with the annular flange 162 of the primary housing for the pellet-making device 126. These flanges 162 and 203 are fastened together and the depending skirt of the housing 202 confines the falling wafers 201 and directs them into an elevator 204. The elevator 204 consists of a flat belt 205 with cross slats 206 thereon. The finished wafers 201 are dropped directly onto the belt 205 and the cross slats 206 move these wafers upwardly and rearwardly for deposit in a trailing wagon or the like.

In the operation of the device as shown in FIGS. 3 and 4, the procedure is much the same as in the device of FIGS. 1 and 2 wherein the machine is propelled through a field in which the hay has been preliminarily windrowed and the hay from the windrow is moved up onto the platform deck 122 by means of the pickup cylinder 119. The transversely disposed auger conveyor 123 moves the hay on the platform deck through the unjournaled end 124 thereof and into the pre-compressing device 125. The distinction between the pre-compressing device of FIGS. 3 and 4 and the pre-compressing device of FIGS. 1 and 2 is in the form and type of compressor. FIGS. 3 and 4 show horizontally disposed, vertically positioned cooperative rolls 139 and 140. The lower roll 140 has radial fingers 157 which act as feed fingers for the hay as it is discharged from the auger conveyor 123. The hay is then moved in between the rolls 139 and 140, causing a pre-compression of the hay and a preliminary compacting before the hay is permitted entrance to the annular chamber 159 of the rotor 160. The radial fingers 157 of the compressing roll 140 extend into the spaced annular grooves 158 in the compressing roll 139 so that there is an interengagement of the roll elements insuring a positive feed of the hay therethrough and a positive pre-compacting of that hay. The rollers 139 and 140 are of substantial weight and as they are driven in the direction of the arrow 144 toward the pellet making device 126 the intermediately disposed hay is pre-compressed.

Following the discharge of the pre-compressed hay 164 it is then directed into the annular chamber 159 defined by the vertically spaced-apart flanges 185 and 186. Actually, as stated for the device of FIGS. 1 and 2, the hay is not directed into any one specific small chamber like 188 or 189, but rather is directed into the large area composing all of the individual chambers 188 and 189. As the small pistons 183 and 184 are moved through this chamber 159 by reason of the action of the wobble plate 169, a charge of pre-compressed hay is moved downwardly into the chamber 188 or 189 forming pellets 187. As the individual hay charges or wafers 187 are moved downwardly through the discharge tubes 190 and 191 they are further compacted by the tapering discharge ends of the tubes. The degree of taper may be varied by reason of the fluid cylinder and piston 196–197. When the piston 197 is retracted within the cylinder 196, the bushings 199 and 200 are moved upwardly on the tubes 190 and 191 respectively, causing the taper to increase thereby making the wafers more dense. Conversely, when the piston 197 is extended from the cylinder 196, the conical-shaped bushings 199 and 200 are moved downwardly thereupon permitting the tubes 190 and 191 to spread about their downwardly opening slots 194 and 195. These adjustments provide for uniformly dense wafers. In any event, wafers of a desired density may be established by the operator and are discharged onto the elevator 204 and are thereupon carried upwardly and rearwardly on the belt conveyor 205 by the cross slats 206. Attention is directed to FIG. 3 wherein the completed wafers 201 are shown being so elevated.

As shown in FIG. 3, there is provided a forwardly extending tongue member 207 having a hitch member 208 at the forward end. This hitch member 208 is adapted to be attached to a pulling tractor or the like so that the machine may traverse a field of windrowed hay for its operation.

Figure 5:
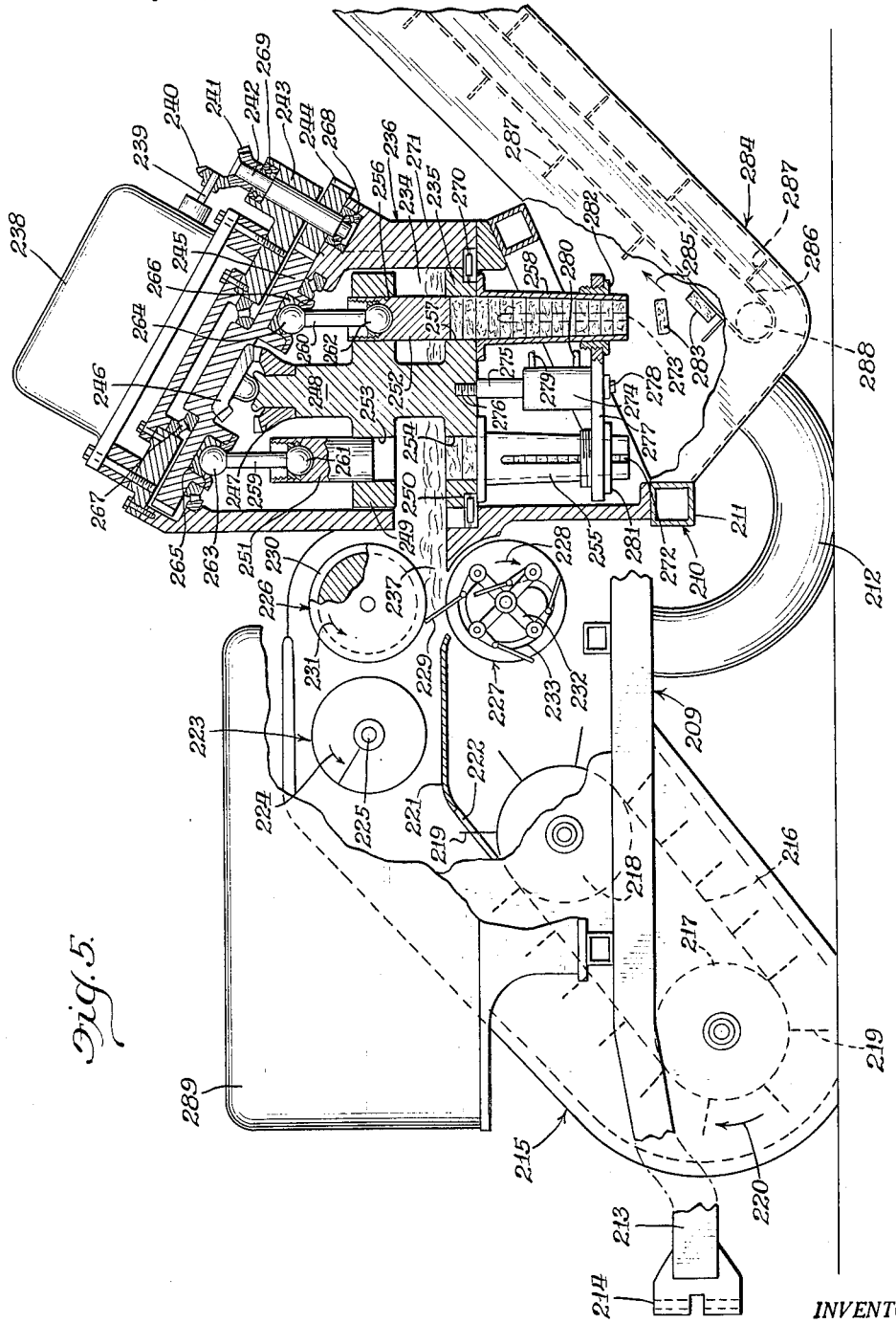
FIG. 5 is a longitudinal sectional view partially in elevation of a further modified form of wafer making machine.

The device of FIG. 5 shows a still further modified form of the invention. In this device the elements are substantially the same but for a somewhat different geographical arrangement and a somewhat different drive arrangement. Here again there is provided a supporting frame structure 209 having a wheel truck 210 including a cross tubular beam 211 having wheels 212 mounted at each end thereof to support the intermediately disposed machine. A forwardly and angularly extending tongue 213 is provided in association with the frame structure 209 and by means of a hitch element 214 at the forward end of the tongue the machine is capable of being pulled through a field in which hay has been windrowed.

In the device of FIG. 5 there is also included a pickup mechanism 215 which has an endless conveyor 216 mounted on spaced drum members 217 and 218. The conveyor 216 is in the form of a belt or the like and has outwardly projecting fingers or slats 219 for picking hay up from windrows and moving it in the direction of the arrow 220 so that it moves up over the top of the conveyor 216 and up the incline to a top deck 221. The fingers 219 are shown receding through an opening 222 in the deck 221. A transversely disposed auger conveyor 223 is mounted across the platform deck 221. Rotation of the auger 223 is in the direction of the arrow 224 on the shaft 225 causes a movement of gathered hay to one end of the platform. The end of the auger adjacent the discharge of hay is preferably provided with retracting fingers to cause the hay to move rearwardly at right angles thereto. The retracting fingers are of the type shown in the patent to Oehler 2,529,180. Following the aggregation of hay at the one end it is grasped by the cooperative rolls 226 and 227 which constitute, in this instance, the pre-compression mechanism preliminary to movement of the hay into the pellet forming mechanism. The cooperative compressing rolls 226 and 227 may be constructed in the manner of the rolls 139 and 140 in the modification of FIG. 4 or they may merely be straight compression rolls with no interengaging fingers or the like. However, in the device as shown the lower roller 227 moving in the direction of the arrow 228 has fingers 229 arranged and constructed to pass through annular grooves 230 in the upper roll 226. The upper roll 226 is rotatably driven in the direction of the arrow 231. The fingers 229 shown on the rotor 227 are mounted on a carrier 232 within the roller 227 and by means of a cam track 233 the fingers 229 are arranged to be extended or withdrawn in the rotor 227 dependent upon the position of the roll. The roll 226 is so constructed that the fingers 229 will be extended outwardly for effecting a feeding of hay from the platform deck 221 rearwardly into the annular chamber 234 within the rotor 235 of the pellet-making unit 236. As the fingers 229 move around they are withdrawn radially inwardly of the surface of the rotor 227 so that there is no tendency to pull hay 237 down into the rotor or to the underside thereof. From this point rearwardly the operation of the pellet making unit 236 is substantially the same as the unit 126 shown in FIG. 4. However, the wafer-making machine of FIG. 5 will be described in detail. Drive for the unit 236 includes a motor 238 which may be either electric or fluid operated to impart rotational drive to an output shaft 239 which has a bevel gear 240 mounted on the outer end. A bevel gear 241 in mesh with the bevel gear 240 is mounted on shaft 242 which is journaled within a housing 243 carrying the head of the wobble plate wafer-making machine 236. A spur gear 244 is mounted on the lower end of the shaft 242 and is in engagement with a large spur gear 245 which constitutes the wobble plate of this particular form of the invention.

The wobble plate 245 is provided with an integrally mounted bevel gear 246 centrally of the bottom thereof which is in meshing engagement with a cooperative bevel gear 247. The bevel gear 247 is mounted on and forms a part of a central shaft 248 of the rotor 235. The rotor also includes vertically-spaced annular flanges 249 and 250 which flank the upper and lower surfaces respectively of the annular chamber 234 which constitutes the hay receiving area for the wafer making device 236. The wobble plate 245 is adapted to vertically reciprocate a plurality of hay compressing rams or pistons much in the manner of the devices of FIGS. 1 and 4. Only two such pistons, namely 251 and 252, are shown in FIG. 5 although it should be understood there are six or more such pistons intermittently spaced around the full annular periphery of the rotor 235. A piston passageway 253 in the flange 249 is in vertical axial alignment with a passageway 254 in the lower flange 250 of the rotor 235. The aligned passageways 253 and 254 constitute the passage through which the piston 251 passes in its compression of hay. The charge of hay is moved down into the lower passageway 254 and thence into a pellet discharge tube 255. Similarly, the piston 252 has aligned passageways 256 and 257 in the upper flange 249 and the lower flange 250 respectively. Here again a wafer discharge tube 258 is mounted on the bottom of the rotor 235 and receives the compressed wafers preliminary to discharge. The pistons 251 and 252 are joined with the wobble plate 245 by piston rods 259 and 260. The lower ends of the piston rods are provided with balls 261 and 262 respectively. These balls are mounted in sockets in the upper ends of the pistons 251 and 252. Similarly, the upper ends of the piston rods are provided with balls 263 and 264 and these are respectively mounted in sockets 265 and 266 on the underside of the wobble plate 245. With this construction wherein the rods for the pistons are provided with ball joints at their upper and lower ends, the wobble plate can rotate and provide for reciprocal movement of the pistons within the confined passageways in the rotor 235 without any undesirable binding or cocking of these elements. The ball joints, of course, may swing to one side or the other and assume any angular position necessary in the turning of the wobble plate and the up-and-down movement of the pistons. Suitable bearing members are provided for the various rotating elements of the wafer forming device 36. For example, the wobble plate 245 is equipped with an annular bearing 267 which is mounted between the wobble plate and the cap member 243. Spaced bearings 268 and 269 support the shaft 242 within this same cap structure 243. An annular bearing 270 is mounted intermediate the rotor 235 and the housing 271 which houses the rotor 235. This provides for proper journal mounting of the rotor 235.

The discharge tubes 255 and 258 are again provided with downwardly opening slots 272 and 273 to permit contraction or expansion of the lower ends of these tubes depending upon the density of pellets desired. As in the device of FIG. 4, a fluid operated cylinder 274 is provided with a piston 275 which in turn is threadedly engaged at 276 to the central part of the rotor 235. The lower end of the fluid cylinder 274 is attached to a plate 277 by means of bolt and nut means 278. The plate 277 is thus capable of having vertical movement by the admission or withdrawal of fluid under pressure from the cylinder 274. Fluid carrying lines 279 and 280 are shown on the cylinder 274. The plate 277 contains a plurality of conical-shaped bushings such as those shown at 281 and 282 which engage the external peripheries of the depending discharge tubes 255 and 258 respectively. Thus, in the same manner as the operation for the device of FIG. 4, when the plate 277 is raised there is a greater constriction of the openings at the bottoms of the tubes 255 and 258 whereas if the plate 277 is moved downwardly the discharge opening for each of the tubes is relieved and thus the density of the pellets, such as those shown at 283, may be somewhat lessened.

Here again, as in the devices of FIGS. 1 and 4, an elevator 284 is disposed beneath the discharge ends of the plurality of tubes such as those shown at 255 and 258 to receive formed pellets and carry them upwardly and rearwardly in the direction of the arrow 285. The conveyor mechanism within the elevator includes a belt 286 and paddle members 287 which are driven by means not shown. The belt 286 is shown passing over a pulley 288 at its lower end and similarly another pulley, not shown, is provided at the upper end of the belt 286.

The device of FIG. 5 is provided with an engine 289 which is mounted on the frame structure 209 and by suitable driving connections the various elements such as the pickup mechanism 215, the auger 223, the pre-compressing rotors 226 and 227, and the elevator 284, are driven thereby. However, inasmuch as the particular drives do not perform a special part of the modified form of the invention as shown in FIG. 5 it is not believed necessary to further show the drives in detail.

In the operation of the device of FIG. 5, windrowed hay in a field is picked up by the mechanism 215, carried across the generally horizontally disposed deck 221 by the auger conveyor 223, and thence fed inwardly by the pre-compressing rotors 226 and 227 by the fingers 229 which, as previously stated, sweep the hay from the platform deck between the pre-compressing rollers and thence in this pre-compressed state feed it directly into the annular opening 234 within the rotor 235. The fingers 229, as described in detail above, are retractable within the rotor 227 so that there is no tendency of feeding hay around the rotor but rather all of the hay is moved rearwardly of the machine into the rotor 235. The pre-compressed hay is thus moved in and around the rotor 235 between the spaced flanges 249 and 250 and within the area of reciprocation of the plurality of wafer compressing pistons such as those shown at 251 and 252. In the case of the piston 251 the wobble plate 245 has withdrawn this piston so that as presented to the incoming hay the piston is up within the chamber 253 and upon rotation of the rotor 235 the piston moves through the annular chamber 234 and compresses the hay into wafers such as shown beneath the piston 252. Completed wafers are discharged through the bottoms of each of the depending tubes 255 and 258.

Figure 6:
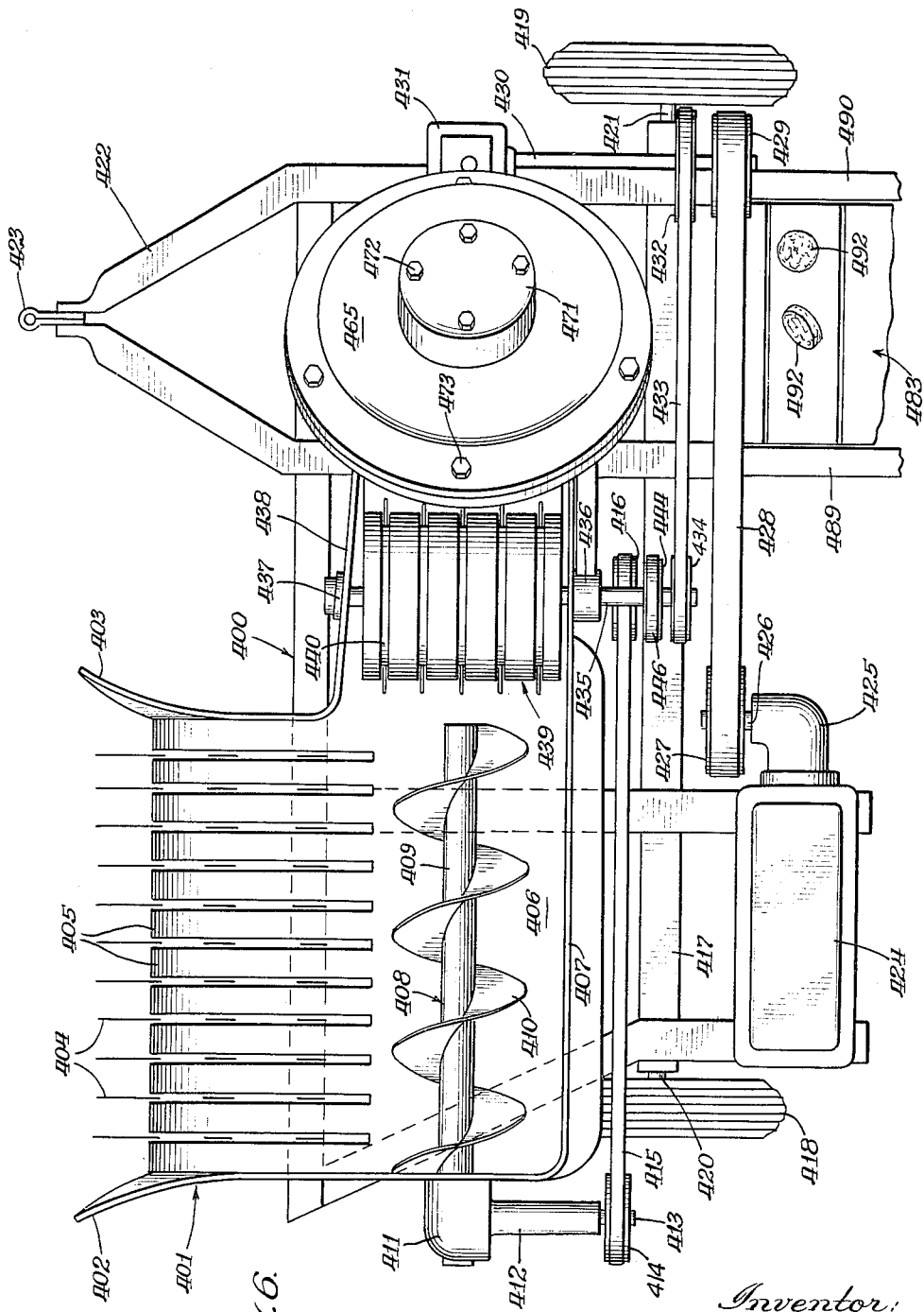
FIG. 6 is a top plan view of a modified hay waferizer of this invention.
Figure 7:
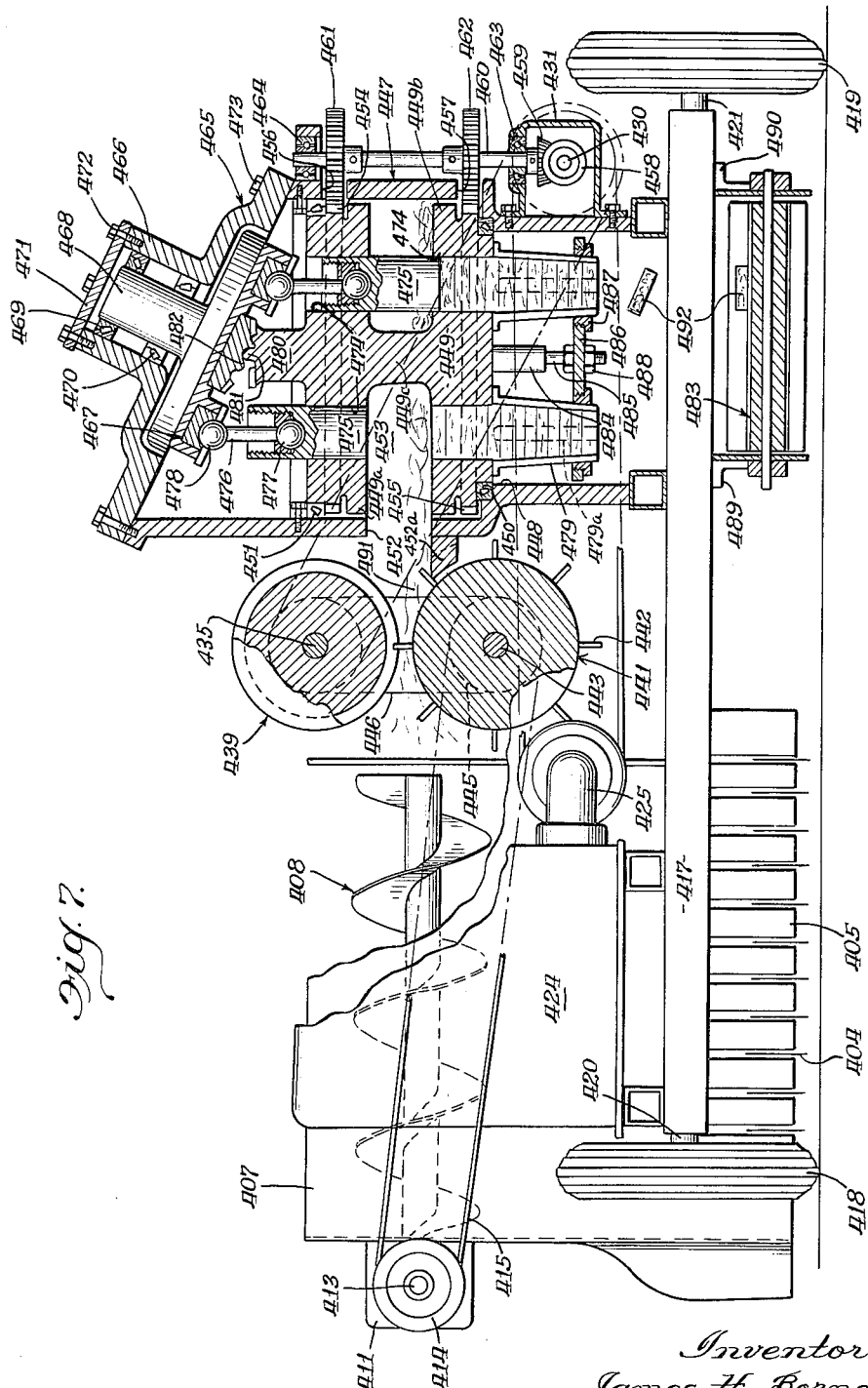
FIG. 7 is a rear elevational view partially in section of the device as shown in FIG. 6.

The device as shown in FIGURES 6 and 7 is a further modification of the hay waferizer of this invention. Generally the machine of FIGURES 6 and 7 is comparable to the wafer making machine as shown in the devices of FIGURES 1 through 5 but it is believed variations such as in the drive of certain of the elements are sufficiently different to warrant their detailed description. The device of FIGURES 6 and 7 includes a frame supporting structure 400 with a hay pickup 401 mounted on the left front thereof. Thus as the waferizer is pulled through a field in which hay has been previously windrowed the pickup will bring this windrowed hay into the machine for compression thereof into small pellets or wafers.

The pickup is defined by side dividers or guides 402 and 403 which are laterally spaced apart. These guides act to direct windrowed hay into the area therebetween for engagement by spring fingers 404. The spring fingers are radially extending from the pickup 401 between circularly formed strips of metal 405. The fingers 404 are thus disposed intermediate the strips 405 which form a curved deck between the radially extending fingers to thereby feed hay upwardly thereover. The pickup 401 forms a part of a hay receiving platform having a horizontal deck 406 with a generally vertically disposed back-wall 407. Hay delivered upwardly and rearwardly by the spring pickup fingers 404 over the curved deck strips 405 and then on to the horizontal deck 406 will be halted in its rearward movement by the back-wall 407.

A transversely disposed platform auger 408 is positioned above and over the deck 406. The auger 408 includes a core 409 and spiral flight 410 therealong. The auger 408 is generally supported only at one end. This support is shown in FIGURE 6 as terminating in a gear box 411 which is mounted just laterally outwardly of a rearward extension of the divider 402. The gear box 411 is equipped with a rearwardly extending fixed tubular housing 412 for the journal support of a rearwardly projecting shaft 413. Thus it should be understood that even though the interior of the gear box 411 has not been disclosed it does contain gear members adequate to receive rotational drive through the input shaft 413 and turn that drive at right angles to deliver rotational drive to the laterally disposed platform auger 408. The auger 408 thus is equipped to deliver hay, which has been deposited on the deck 406, transversely toward the wafer making mechanism of this device.

A V-pulley 414 is keyed or otherwise fastened to the shaft 413 and by means of a V-belt 415 drive may be received from a spaced apart V-pulley 416. The location and the means for delivering drive to the pulley 416 will be subsequently described.

The waferizing machine of FIGURES 6 and 7 is provided with a transverse beam 417 forming part of the frame supporting structure 400. At the opposite ends of this beam are ground engaging wheels 418 and 419. The ground engaging wheels 418 and 419 are respectively carried on axles 420 and 421. The frame supporting structure 400 includes what is known in the industry as an A-type hitch 422. The A-frame member 422 includes a socket 423 acting as the hitch means for joining this vehicle with a pulling tractor or the like.

An engine 424 is mounted on the frame supporting structure 400 and provides the drive means for all of the moving elements in the waferizing machine as shown in FIGURES 6 and 7. A gear box 425 is mounted on the end of the engine 424 and receives drive from the engine. Rotational drive is imparted to an output shaft 426 which as shown in FIGURE 6 projects forwardly from the gear box 425. A pulley 427 is affixed to the shaft 426 and by means of a belt 428 engine drive is delivered to a spaced apart pulley 429. The pulley 429 is mounted on a shaft 430 which is journally supported at the far side of the wafer making machine opposite the pickup 401. The shaft 430 delivers engine rotation to a gear box 431 supported on the frame supporting structure 400 at a position forwardly of the pulley 429.

A pulley 432 is keyed or otherwise fastened to the shaft 430 at a position spaced from the pulley 429. By means of a belt 433 engine drive is similarly delivered to a pulley 434 mounted on a shaft 435.

The shaft 435 is carried in spaced apart bearings 436 and 437 which are respectively carried on the back wall 407 and a continuation wall 438 which constitutes a rearward and lateral extension of the front divider 403.

The shaft 435 carries the upper roll 439 of a hay pre-compressor and hay feed mechanism. This upper roller 439 is provided with laterally spaced apart annular grooves 440. The upper roll 439 is in cooperative engagement with a lower roller 441 to effect the feeding of hay from the unjournaled end of the auger 408 and deliver that hay into the wafer making mechanism of this modified device. The lower feed roller 441 is provided with radially projecting fingers 442 which are adapted to engage and penetrate within the annular grooves 440 in the upper feed roller 449. This interengagement of the radial fingers 442 with the annular grooves 440 insures positive feeding of all hay that is passed therethrough. The lower roller 441 is mounted on a shaft 443 disposed parallel to and spaced directly beneath the shaft 435 for the upper feed roll 439. The shaft 443 is similarly journaled in the back wall 407 and the spaced apart extension wall 438 as for the upper roller shaft 435.

A pulley 444 is fastened to the shaft 435 adjacent the upper roller 439 as shown in FIGURE 6. An aligned pulley 445 is fastened to the shaft 443 and a belt 446 passes over the pulleys 444 and 445 thereby imparting drive therebetween. It is therefore apparent the upper roller 439 is driven by reason of its being mounted on the shaft 435 which receives its rotational drive through the medium of the belt 433 and pulley 434 mounted on this shaft. The lower cooperative feed roller 441 thus receives its drive from the upper roller shaft 435 through the belt 446 carrying this drive downwardly.

As best shown in FIGURE 7 the wafer making device includes a cylindrical housing 447 which is mounted on and is carried by the supporting frame 400. The cylindrical housing is disposed in a generally vertical position and is located adjacent the vertically disposed cooperative feed rollers 439 and 441. Thus the transversely disposed auger 408, the cooperative feed rollers 439 and 441, and the cylindrical housing 447 are in substantial alignment with each other so that hay brought into the machine by the pickup 401 will be conveyed directly from the deck 406 by the auger conveyor 408 through the cooperative feed rollers 439 and 441 and into the housing 447.

The cylindrical housing is provided with an inwardly projecting annular flange 448 as shown in FIGURE 7. A generally vertically disposed drum 449 consisting of spaced apart blocks or the like 449a and 449b, joined at their centers by a core or post member 449c. The drum 449 is journally supported within the cylindrical housing 447 and rests on the inwardly projecting annular flange 448. A tapered roller bearing 450 is disposed intermediate the annular flange 448 and the drum 449 in order to carry the drum within the housing with a minimum of friction. A second annular bearing 451, preferably of the tapered roller type, is spaced above the bearing 450 and is disposed intermediate an upper portion of the drum 449 and the housing 447.

The housing 447 is provided with an arcuate notch 452 at a position adjacent the juncture of the combination feed and pre-compressing rollers 439 and 441. An annular groove 453 in the side of the drum 449 surrounds the center post 449c between the upper and lower portions 449a and 449b. The annular groove is on a level with the housing notch 452 and thus also on a level with the juncture between the pre-compressing rolls 439 and 441. A ledge 452a joins the housing 447 at the lower edge of the arcuate notch 452 to provide a feeding surface for the hay delivered from the feed rolls into the drum 449.

Spaced apart ring gears 454 and 455 are formed integrally with the drum 449 on the outer surfaces of the generally cylindrical block portions 449a and 449b. The circumference of the ring gears 454 and 455 is either the same as or slightly less than the outer circumference of the portions 449a and 449b of the drum so that the ring gears are completely within the outer housing 447. A notch 456 is provided in the housing 447 adjacent a small segment of the ring gear 454. Similarly a notch 457 is provided in the housing adjacent a small segment of the ring gear 455.

The shaft 430 within the gear box 431 is provided with a bevel gear 458 which cooperates with a bevel gear 459 disposed at right angles thereto. A vertically positioned shaft 460 extends upwardly out of the gear housing 431 and has the bevel gear 459 mounted at its lower end. The shaft 460 carries spaced apart pinion gears 461 and 462 to engage the ring gears 454 and 455 respectively through the arcuate notches 456 and 457. Thus we are now able to impart rotational drive to the drum 449 within the stationary housing 447. The shaft 460 is journally supported in vertically spaced apart bearings 463 and 464 which are in turn carried on the gear box 431 and the cylindrical housing 447 respectively.

A cap 465 is provided for the housing 447 and includes an angularly disposed socket 466 in the center thereof. A wobble plate 567 is provided with a center post 468 which extends into and is journally supported within the socket 466 by spaced apart bearings 469 and 470. A smaller cap 471 is adapted to cover the socket 466 and by means of cap screws 472 is secured to the upper peripheral edge of the socket 466. Similarly cap screws 473 hold the main cap 465 to the housing 447. Thus the housing 447, the main cap 465, and the center cap 471 are fixed and stationary relative to the internally rotating drum 449. The wobble plate 467 rotates with the drum.

The drum 449 is provided with a plurality of vertically disposed axially aligned chambers 474 in the upper and lower blocks 449a and 449b. The chambers 474 are arranged in a generally circular path around the drum and extend through the annular groove 453 around the center post 449c. Pistons or rams 475 are provided in each of the chambers 474 and by means of connecting links 476 are joined to the wobble plate 467. The connecting links 476 are equipped with ball ends 477 to swivelly engage the upper ends of the rams 475. The other ends of the connecting links 476 are provided with similar ball ends 478 for swivelly engaging the wobble plate 467. Thus there is provided a universal joint type of movement between one end of the connecting links and the adjoining wobble plate and between the other end of the connecting links and the multiple rams to thereby avoid any binding of movement of rams within the chambers 474 in the compression of hay therein.

The bottom of the drum 449 is provided with a plurality of sleeve-like, slightly tapered restrictors 479 located at the bottom of each of the chambers 474 to thereby form continuations of the wafer forming chambers 474.

The drum 449 is provided with an upwardly projecting center post 480 which is equipped at its top with a bevel gear 481. The bevel gear 481 is in meshing engagement with a bevel gear 482 on the center undersurface of the wobble plate 467. There is thus provided driving mechanism between the drum 449 and the wobble plate 467. Of course the wobble plate would be driven by reason of the engagement thereof with the multiple rams 475 and their connecting links 476, but it is deemed desirable to have this center engagement of bevel gears to thereby insure uniform drive throughout the drum and the wobble plate.

A horizontally disposed conveyor 483 is adapted to run from front to rear of the waferizer and thus pick up the completed hay wafers and discharge them rearwardly.

A fluid cylinder 484 is affixed to the bottom of the drum 449 and is equipped with a downwardly projecting piston 485. The piston 485 engages a plate 486 which with the aid of bushings 487 engages the tapered circumferential sides of the restrictors 479. Nuts 488 lock the plate 486 to the piston 485 and thus with the admission or withdrawal of fluid under pressure to the cylinder 484 the plate 486 moves upwardly or downwardly to either restrict to a greater extent or relieve the binding of the wafers which are being formed within the chambers 474 and the downwardly extending restrictors 479. As shown the restrictors 479 are in the form of sleeves which are vertically slitted as shown at 479a to permit constriction or expansion as necessary.

The water removing conveyor 483 is carried on spaced apart frame members 489 and 490 which are in turn supported on the frame supporting structure 400.

In the operation of the device of FIGURES 6 and 7 windrowed hay is gathered by the pickup 401 and deposited on the deck 406 whereupon the transversely disposed open end auger 408 delivers hay to the interengaging feed rolls 439 and 441 which are also the means for pre-compressing the hay. The hay shown at 491 is fed and pre-compressed by the cooperative rolls prior to its entry into the annular chamber 453 in the drum 449. The drum 449 is rotated by the driving of its integral ring gears by the pinion gears 461 and 462. The pinions receive their source of rotative power from the engine 424. The rams 475 are reciprocated by the wobble plate 467 to cause pellets or wafers 492 to be formed in the lower ends of the chambers 474 in the drum 449. As shown in FIGURE 7 the ram or piston 475 disposed adjacent the opening 452 is fully retracted upwardly so that the space is open and unobstructed to receive incoming hay. Now as the drum 449 rotates, the wobble plate 467 causes the ram 475 to move downwardly to the position as shown on the right hand side of FIGURE 7. Thus the ram has moved from the upper cylindrical block 449a downwardly through the chamber 453 to pick up hay which has been fed thereto by the cooperative feed and pre-compressing rolls and moved into the lower cylindrical block 449b to thereby form hay pellets or wafers 492. As these wafers 492 are expelled out the bottom of the restrictors 479 they drop onto the conveyor 493 whereupon they are fed rearwardly for deposit into a trailing wagon or the like or onto the ground as desired. The position of the restrictor operating plate 486 is determined by the condition of the hay which is being compressed and thus the restrictors 479 may be opened or closed to accomplish the formation of wafers of the proper density and compression.

It is therefore believed that the device of FIGURES 6 and 7 contributes materially to the advancement of the waferizing art.

The device of FIGURES 8 and 9 shows a still further modification of the invention presented in this application. Generally, the machine of FIGURES 8 and 9 is a wafer-making device having a multiple number of rams. Pre-compressed hay is fed to an annular chamber through which the multiple number of rams progressively travel. Reciprocation of the rams is accomplished by fluid pressure opearting means. The modification of FIGURES 8 and 9 is quite similar to the arrangement of the modified device of FIGURES 6 and 7 but rather employs cooperative cylinders and pistons to effect ram movement.

As shown in FIGURES 8 and 9 the waferizer includes a frame supporting structure 500 having ground engaging supporting wheels 501. A hay picking 502 is mounted on the frame structure 500 and is adapted to deliver hay from a field windrow onto a platform 503. The pickup is provided with side dividers 504 and 505 which define the width of the intermediate pickup. The pickup itself includes a plurality of spring fingers 506 which sweep upwardly to pass hay from a windrow over a curved deck formed of intermediate strips 507 arranged in an arcuate manner whereupon the picked up hay is delivered rearwardly to a flat deck 508 of the platform 503. The platform includes a back wall 509 and is further defined by a lateral extension 510 of the divider 505. This lateral extension 510 is substantially parallel to the back wall 509 and as will later be seen the parallel walls constitute a means for supporting the cooperative combination feed and pre-compressing rolls.

A transversely disposed auger 511 is mounted on the platform 503 over the flat deck 508 to thereupon deliver hay deposited on the platform laterally toward a hay precompressing device which will be later described. The auger 511 is carried at one end in a gear box 512 which is mounted on a rearward extension side wall of the divider 504. The other end 513 of the auger 511 is unjournaled or open so that hay may be fed therethrough without any obstruction. The auger includes a central core 514 and spiral flight 515 extending therealong.

The gear box 512 has a rearward sleeve-like tubular extension 516 which journally supports a shaft 517. The outer end of the shaft 517 carries a pulley 518 for receiving drive from a belt 519. The belt 519 extends crosswise of the machine and is mounted on its other end on a pulley 520 which in turn is mounted on a shaft 521 as shown in FIGURE 9.

An engine 522 provides the rotational drive for all of the elements of the waferizing machine as shown herein. The engine 522 is equipped with a gear box 523 at its output end. A shaft 524 is journally supported and driven from the gear box 523. A relatively large pulley 525 is affixed to the shaft 524 and by means of a belt 526 drive is imparted from the engine to a pulley 527 located on the far side of the machine. The pulley 527 is mounted on a shaft 528 which is disposed longitudinally of the line of travel of the waferizing machine. The longitudinally disposed shaft 528 carries a second pulley 529 and by means of a belt 530 engine drive is carried back across the machine to a pulley 531. The pulley 531 is affixed to a shaft 532 on which an upper feed roll 533 is mounted. The upper feed roll 533 as shown in FIGURE 9 cooperates with a lower feed roll 534. The lower roller 534 is mounted on the shaft 521 which as previously explained carries a pulley 520. The shaft 532 also carries a pulley 533a spaced outwardly from the upper feed roll 533 and by means of a belt 533b drive is delivered downwardly to the shaft 521 through the medium of a pulley 534a mounted on the lower roll shaft 521. It will thus be seen that the engine drive now has progressed across the machine, back to the feed rolls and then back to the auger drive.

The upper feed roll 533 is equipped with spaced apart annular grooves 535. Radial fingers 536 in the lower roll are adapted to penetrate within the annular grooves 535 in the upper feed roll so that hay fed to the juncture between the rolls will be positively drawn through the rolls for pre-compression and simultaneously fed to the wafer-making mechanism of this device. The support for the upper roll shaft 532 is in a bearing 537 carried on the platform back wall 509 and a spaced apart bearing 538 which is carried on the extension wall 510 spaced forwardly from the back wall. Similarly, suitable bearing supports are provided for the lower shaft 521.

The main supporting structure 500 includes an A-frame 539 for effecting a hitch to a pulling tractor or the like. The A-frame includes spaced apart generally parallel longitudinally disposed frame members 540 and 541 which continue through to the rear of the waferizer. These parallel frame members 540 and 541 constitute a support for a completed wafer conveyer 542 which will feed finished wafers of hay rearwardly of the machine either for deposit in a wagon or for dropping onto the ground for subsequent pickup. As best shown in FIGURE 9 the wafer conveyor 542 is carried directly on angle support members 543 and 544 which are disposed beneath the frame members 540 and 541.

A cylindrical housing 545 is mounted on and fastened to the frame members 540 and 541 so that the housing is fixed relative to the frame supporting structure 500. The cylindrical housing 545 is generally vertically disposed and includes an internal annular ledge 546. A tapered roller bearing 547 is mounted on the internal ledge and with the aid of an upwardly spaced apart, preferably tapered, roller bearing 548 a drum 549 is journaly supported for rotation within the cylindrical housing 545.

The drum is equipped with an annular ring gear 550 mounted around its circumference. An annular flange 551 on the drum 549 rides directly on the bearing 547. An annular flange 552 on the drum rides against the upwardly spaced apart annular bearing 548. A notch 553 in the housing 545 is located adjacent one side of the ring gear 550 to thus permit an externally positioned pinion gear 554 to engage the ring gear 550 on the drum. The pinion gear 554 thus passes through the notch 553 to impart rotation to the drum 549 by means of its engagement with the ring gear 550 formed integrally with the outside of the drum.

The pinion gear 554 is attached to a vertical shaft 555 by means of a pin 556. The shaft 555 is supported in its vertical position by means of spaced apart bearings. An upper bearing 557 is shown supported on the side of the cylindrical housing 545 within an auxiliary housing 558. A lower bearing 559 is carried on a gear box 560. The lower end of the vetrical shaft 555 disposed within the gear box 560 has mounted thereon a bevel gear 561. The bevel gear 561 is in meshing engagement with a bevel gear 562 which is disposed at right angles thereto. The bevel gear 562 is mounted on the shaft 528 which as previously described receives its rotational drive directly from the engine 522 through the medium of the belt 526.

The drum 549 is provided with an annular groove 563 such that the drum is substantially divided into an upper cylindrical block 564 and a lower cylindrical block 565. Of course the blocks 564 and 565 are joined at their centers by a post 566. An arcuate notch 567 is provided in the cylindrical housing adjacent the annular groove 563 within the drum 549 to permit the entry of hay from the feed rolls into the drum. A ledge 568 is provided on the housing adjacent the lower edge of the arcuate notch and provides a surface over which hay may be fed from the rolls through the housing to the drum.

The drum is provided with a plurality of vertically disposed cylindrical chambers 569 which extend in axial alignment through the upper and lower block portions 564 and 565. The chambers are adapted to receive rams 570 for the compression of hay into wafers or pellets. One ram is disposed in each of the plurality of chambers and it should be understood that pellets or wafers of highly compressed hay are formed in each of the chambers by reciprocation of the rams 570 therein. The upper portion 571 of the chambers 569 constitute fluid cylinders. Pistons 572 are provided in each of the cylinders 571 and with the aid of piston rods 573 the pistons 572 are joined with the hay compressing rams 570. End bushings 574 are disposed at the bottom at each of the fluid cylinder portions 571 of the chambers 569 and thus define and separate the fluid chamber portions from the hay compression portions of the vertically disposed chambers 569. A hinged gate 600, pivotally mounted at 601 to the outlet of chamber 569, and biased to a closed position by a spring means 602, restricts the discharge of pellets from chamber 569.

The drum 549 is provided with a cap 575 to thus seal the tops of the fluid chambers 571 but for the admission of fluid thereto through suitable tubing or hose conduits. The cap 575 is held to the body of the drum by means of cap screws 576. The top of the cap 575 has a fluid distributor box 577 mounted centrally thereof to receive fluid under pressure from some external source and thereupon distribute the fluid under pressure to the various fluid cylinders 571. The distributor box 577 is equipped with fluid conduits 578 and 579 to deliver fluid under pressure from the box to either the upper or lower portion of each fluid cylinder 571 within the drum 549 and simultaneously to take back fluid under pressure from either the lower or upper portion of each cylinder to the fluid distributor box 577. A fluid input conduit 580 receives fluid under pressure from an external source (not shown)

and by means of a swivel connection 581 delivers that fluid under pressure to the distributor box for suitable passage through either of the conduits 578 or 579 depending upon the direction of movement desired for the rams 570. The input conduit 580 and thus also the swivel connection 581 remain stationary while the drum 549 and its superstructure including the fluid distributor box 577 rotate.

A fluid cylinder 582 is provided on the bottom of the drum 549 and by delivery of fluid under pressure to the cylinder 582 the downwardly projecting piston 583 may be set to any desired extension. The lower end of the pistion is provided with a generally horizontally disposed plate 584. It is through the medium of this plate which is vertically positionable by the extension of retraction of the piston 583 that downwardly projecting, slightly tapering, restrictors 585 as shown in FIGURE 9 may be opened or closed to gain the proper density for the hay wafers being formed. The restrictors form downward continuations of the chambers 569 in the drum. The tapering sleeve-like restrictors are more or less restricted by the vertical position of the plate 584. Bushings 586 are fastened to the plate and encircle each of the lower ends of the restrictors 585. The slightly conical shape of the restrictors insures that when the plate 584 and its associated bushings 586 are moved upwardly the lower ends of the restrictors are pulled inwardly thereby further restricting the passage of formed hay wafers therethrough. Conversely when the plate 584 is moved downwardly the restrictors are opened causing freer passage for the hay pellets and thus the overall effect is to lessen the density of the wafers that are successively formed in this device. Lock nuts 587 are employed to fasten the piston 583 to the plate 584 thereby insuring concurrent movement of the plate with the piston.

In the operation of the device of FIGURES 8 and 9 of this invention hay is picked up from windrows and deposited rearwardly onto the platform 503 whereupon the auger conveyor 511 moves the hay laterally of the line of travel of the waferizer into the combination cooperative feed and pre-compressing rollers 533 and 534. Thus the hay 588 is preliminarily compressed by the rollers 533 and 534 and positively fed by reason of the inter-engagement of the radial fingers 536 with the annular grooves 535 in the upper roller 533. The hay 588 progressively moves over the ledge 568 through the aperture 567 in the cylindrical housing 545 and then into the annular chamber 563 in the drum 549. As in the case of all of the other modifications of this wafer-making machine the rams 570 located adjacent the feed opening are retracted into the upper cylindrical block 564. The other rams 570 are extended down at various degrees through the annular chamber 563 picking up hay 588 therein and then forcing that charge of hay into the aligned chamber in the lower cylindrical block 565 to form the hay wafers 589. The fluid pressure distributor box 577 is arranged with suitable valving to provide for the delivery or fluid under pressure to the fluid cylinders 571 in a regular progressive order such that the rams 570 will be withdrawn into the upper cylindrical block 564 of the drum 549 at the position of entry of hay from the pre-compressing rolls 533 and 534. When the drum rotates, the rams 570 will be moved downwardly until they reach the far side of the drum as shown in FIGURE 9. The ram shown on the right side in this figure has passed through the chamber 563 and compressed the hay 588 therein into wafers as shown at 589. During the balance of movement of the drum cycles the rams are withdrawn upwardly in gradual succession until the ram is disposed at the hay receiving side where it is fully withdrawn into the upper block portion 564 thus enabling receipt of new hay without any interference from the rams. As previously stated the density of the hay wafers is controlled by the positioning of the plate 584 relative to the bottom of the drum 549 to either open or close the restrictor elements 585. As the charges of hay 588 are forced down into the chambers 569 in the lower drum block 565 they generally retain their individual status so that as they are discharged from the bottom of the restrictor 585 the formed wafers 589 drop onto the conveyor 542 for rear discharge. In the device of FIGURES 6 and 7 the driving power for the rams is received from the wobble plate whereas in the device of FIGURES 8 and 9 the driving power for the rams 70 is received from fluid under pressure. Otherwise the devices are quite similar in that the drums are of the same formation and have an annular ring gear therearound for receiving rotative drive from a pinion gear passing through an aperture in the outer stationary housing. The devices are also similar in their compressing of hay into wafers or pellets by reason of movement of the rams through the annular hay receiving chambers 563 and moving the charges of hay picked up in this chamber down into the restricted chambers 585 in axial alignment with the rams in the lower drum block portion 565.

The end result of all of the modified forms of hay waferizers as shown in this application is to take loose windrowed hay, precompress it and then finally compress it into wafer formation in a device employing a plurality of rams and discharging completed wafers in rapid succession.

I am aware that numerous details of construction may be varied throughout a wide range without departing from the principles disclosed herein, and I therefore do not propose limiting the patent granted hereon otherwise than as indicated by the appended claims.

What is claimed is:

1. A multiple stage hay waferizer, comprising: a first stage including continuously operable means for precompressing and force feeding hay to a waferizing stage; said waferizing stage including a housing, a feed opening in said housing into which said first stage unit force feeds said precompressed hay; a rotor in said housing, said rotor having an axis of rotation, a feed chamber formed around the periphery of said rotor transversely of said axis and adjacent said feed opening, said feed chamber moving past said feed opening on rotation of said rotor; a plurality of longitudinally disposed waferizer cylinder bores in said rotor, each said waferizer cylinder bore having an inlet opening into said feed chamber, a ram reciprocable in each of said waferizer cylinder bores, drive means on said waferizer associated with said rotor for rotation thereof, means cooperating with said rams for reciprocation thereof in timed relation with each other; the reciprocating action of each said ram opening and closing the inlet of its respective cylinder bore in timed relation with the remaining of said rams, at least one of said waferizer cylinder bore inlets being open at any one instance; a final hay compression stage including a hay discharge tube joined to at least one of said bores for further compression of the hay wafers produced in said one bore, said hay discharge tube having a variable discharge opening, and means on said tube for varying the discharge opening thereof.

2. A multiple stage hay waferizer as recited in claim 1, wherein: said continuously operable means comprises a pair of rolls, one of said rolls has a plurality of banks of pins projecting outwardly on the surface thereof, and the other of said rolls has a plurality of annular grooves formed in the surface thereof, a separate one of said grooves being aligned with a separate one of said banks of pins.

3. A multiple stage hay waferizer as recited in claim 2, wherein: said hay discharge tube is slit inwardly from the outer end thereof, and said means for varying said discharge opening of said tube comprises a conical-shaped bushing engaging the outer periphery of said discharge tube, said bushing being movable lengthwise on said tube to vary the size of said discharge opening.

4. A multiple stage hay waferizer as recited in claim 1, wherein: said continuously operable means comprises a pair of rolls, one of said rolls has a plurality of banks of retractable fingers around its periphery, a cam track attached to said one roll, means on said retractable fingers and cooperating with said cam track for extending and retracting said fingers, a plurality of grooves in the surface of the said other roll, each one of said grooves being in alignment with a separate one of said banks of fingers.

5. A multiple stage hay waferizer as recited in claim 4, wherein: said hay discharge tube is slit inwardly from the outer end thereof, and said means for varying said discharge opening of said tube comprises a conical-shaped bushing engaging the outer periphery of said discharge tube, said bushing being movable lengthwise on said tube to vary the size of said discharge opening.

6. A multiple stage hay waferizer as recited in claim 1, wherein: said continuously operable means comprises a pair of endless belt conveyors.

7. A multiple stage hay waferizer as recited in claim 6, wherein: said hay discharge tube is slit inwardly from the outer end thereof, and said means for varying said discharge opening of said tube comprises a conical-shaped bushing engaging the outer periphery of said discharge tube, said bushing being movable lengthwise on said tube to vary the size of said discharge opening.

References Cited by the Examiner

UNITED STATES PATENTS

| | | | |
|---|---|---|---|
| 46,785 | 3/65 | Dunning | 100—138 X |
| 417,877 | 12/89 | Mayo | 100—185 |
| 657,607 | 9/00 | Luzatto | 100 |
| 874,306 | 12/07 | Cumpston | 100—139 X |
| 938,252 | 10/09 | Laughlin | 100—185 |
| 970,575 | 9/10 | Von Traubenberg | 100 |
| 1,666,055 | 4/28 | De La Haba et al. | 100—176 |
| 1,819,480 | 8/31 | Paxton. | |
| 1,845,140 | 2/32 | Farrel | 100—176 |
| 2,381,620 | 8/45 | Russell | 100—139 X |
| 2,984,173 | 5/61 | Roche et al. | 100 |
| 3,009,413 | 11/61 | Alexander et al. | 100 |
| 3,044,391 | 7/62 | Pellett | 100—148 |
| 3,090,295 | 5/63 | Crane et al. | 100—97 |

FOREIGN PATENTS

| | | |
|---|---|---|
| 533,608 | 12/21 | France. |
| 688,183 | 5/30 | France. |
| 918,288 | 10/46 | France. |
| 21,553 | 5/83 | Germany. |
| 4,583 | 1883 | Great Britain. |

WALTER A. SCHEEL, *Primary Examiner.*

ABRAHAM G. STONE, ANTONIO F. GUIDA,
*Examiners.*